(12) United States Patent
Sasaki et al.

(10) Patent No.: US 11,195,016 B2
(45) Date of Patent: Dec. 7, 2021

(54) PILE HEAD ANALYSIS SYSTEM, PILE HEAD ANALYSIS METHOD, AND STORAGE MEDIUM IN WHICH PILE HEAD ANALYSIS PROGRAM IS STORED

(71) Applicant: TOPCON CORPORATION, Tokyo (JP)

(72) Inventors: Daisuke Sasaki, Tokyo (JP); Koji Onishi, Tokyo (JP); Masaki Takanashi, Tokyo (JP); Kiyoyasu Takahashi, Tokyo (JP); Shugo Akiyama, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 439 days.

(21) Appl. No.: 16/140,595

(22) Filed: Sep. 25, 2018

(65) Prior Publication Data
US 2019/0102624 A1 Apr. 4, 2019

(30) Foreign Application Priority Data
Sep. 29, 2017 (JP) .............................. JP2017-190104

(51) Int. Cl.
*G06K 9/00* (2006.01)
*B64C 39/02* (2006.01)
*G06T 17/05* (2011.01)
*E02D 13/06* (2006.01)
(Continued)

(52) U.S. Cl.
CPC .......... *G06K 9/00664* (2013.01); *B64C 39/02* (2013.01); *B64C 39/024* (2013.01); *E02D 5/223* (2013.01); *E02D 13/06* (2013.01); *G01C 11/06* (2013.01); *G06T 17/05* (2013.01); *B64C 2201/123* (2013.01)

(58) Field of Classification Search
USPC ............ 382/154, 218, 305, 100, 103; 702/5; 345/419
See application file for complete search history.

(56) References Cited

U.S. PATENT DOCUMENTS

| 10,186,049 B1* | 1/2019 | Boardman ................. G06T 7/75 |
| 10,217,207 B2* | 2/2019 | Marra ................... G05D 1/0038 |
| 10,443,202 B2* | 10/2019 | Waxse ..................... E02D 7/06 |

(Continued)

FOREIGN PATENT DOCUMENTS

| CN | 102840852 A | 12/2012 |
| EP | 2597422 A2 | 5/2013 |

(Continued)

OTHER PUBLICATIONS

Extended Search Report dated Feb. 15, 2019, in connection with European Patent Application Serial No. 18196544.3, 9 pgs.

(Continued)

*Primary Examiner* — Ishrat I Sherali
(74) *Attorney, Agent, or Firm* — Chiesa Shahinian & Giantomasi PC (57) ABSTRACT

A pile head analysis system captures a plurality of images of a construction site including a pile using a camera mounted on an unmanned aerial vehicle (UAV), acquires the images, generates a three-dimensional model of the construction site, detects a pile head from the three-dimensional model, and determines consistency between the detected pile head and preliminarily acquired design information.

6 Claims, 4 Drawing Sheets

(51) Int. Cl.
*E02D 5/22* (2006.01)
*G01C 11/06* (2006.01)

(56) References Cited

U.S. PATENT DOCUMENTS

| | | | |
|---|---|---|---|
| 2010/0030478 A1* | 2/2010 | Saitoh | G01M 7/08 |
| | | | 702/14 |
| 2012/0300070 A1 | 11/2012 | Ohtomo et al. | |
| 2013/0135440 A1 | 5/2013 | Ohtomo et al. | |
| 2014/0125657 A1* | 5/2014 | Murali | G06F 30/13 |
| | | | 345/419 |
| 2016/0307366 A1 | 10/2016 | Priest et al. | |
| 2017/0066135 A1* | 3/2017 | Cohen | H04L 67/12 |
| 2017/0206648 A1* | 7/2017 | Marra | G01C 21/20 |
| 2018/0147998 A1 | 5/2018 | Ohtomo et al. | |
| 2019/0033074 A1* | 1/2019 | Ikeda | G01C 15/06 |

FOREIGN PATENT DOCUMENTS

| | | |
|---|---|---|
| EP | 2902744 A1 | 8/2015 |
| JP | S63-210614 A | 9/1988 |
| JP | H1-219215 A | 9/1989 |
| JP | H11-325884 A | 11/1999 |
| JP | 2011122313 A | 6/2011 |
| JP | 2014-153336 A | 8/2014 |
| JP | 2016-020910 A | 2/2016 |
| JP | 2016-180681 A | 10/2016 |
| JP | 2017-096688 A | 6/2017 |

OTHER PUBLICATIONS

Office Action dated May 25, 2021, in connection with Chinese Patent Application No. 201811108217.9, 14 pgs. (including translation).

Notice of Reasons for Refusal dated Apr. 13, 2021 in connection with Japanese Patent Application No. 2017-190104, 6 pgs. (with Translation).

\* cited by examiner

PILE HEAD ANALYSIS SYSTEM, PILE HEAD ANALYSIS METHOD, AND STORAGE MEDIUM IN WHICH PILE HEAD ANALYSIS PROGRAM IS STORED

CROSS-REFERENCE TO RELATED APPLICATION

This application claims priority to Japanese Patent Application No. 2017-190104 filed on Sep. 29, 2017, the entire disclosure of which is incorporated by reference herein.

BACKGROUND

The present disclosure relates to a pile head analysis system analyzing a pile head of a pile driven as a foundation of a building, a pile head analysis method, and a storage medium in which a pile head analysis program is stored.

In construction work, it is important to drive a pile serving as a foundation of a building as instructed in a design drawing because driving pile affects construction of the foundation. After the piles are driven, the piles are thus to be checked if the positions of pile cores, the heights of pile heads, and others are accurately driven in accordance with the design drawing.

Conventionally, the position of an driven pile head is measured using a global positioning system (GPS), a total station (TS), and the like to determine deviation of the pile core from the design drawing including, for example, data of a computer aided design system (CAD). In this manner, it is determined whether the pile core is within a tolerance range (within a margin of error in construction) for a design value.

For example, Japanese Unexamined Patent Publication No. 11-325884 describes a technique capable of measuring coordinates of a point to be measured such as a pile head by setting an auto-tracking TS and having an operator carry a target to the measured point and give instructions of measurement.

Furthermore, as described in Japanese Unexamined Patent Publication No. 2017-96688, such a technique has been developed that acquires coordinates of a pile core by acquiring a point cloud model of the construction site and matching a point cloud of a pile head portion with a corresponding pile model.

SUMMARY

With the auto-tracking TS as described in the technique of Japanese Unexamined Patent Publication No. H11-325884, however, the operator measures pile heads by going around the piles one by one, and this problematically requires labor and time. As another problem, the results of measurement may be inconsistent in accuracy depending on the experience and skill of the operator.

Furthermore, the technique of Japanese Unexamined Patent Publication No. 2017-96688 acquires a point cloud model by laser scanning from the sky above the construction site. For detection of pile head portions by laser scanning, the operator scans the entire construction site and acquires point cloud data of the entire construction site, and singles out only a point cloud of a target area including the pile head portions by trimming the acquired data. The point cloud data for the entire construction site problematically causes a significant increase in the amount of data.

Particularly, in a large construction site for a large building, the technique of Japanese Unexamined Patent Publication No. H11-325884 increases the distance and time for an operator moving from a pile to another pile, and the technique of Japanese Unexamined Patent Publication No. 2017-96688 further increases the amount of point cloud data.

To overcome the above problems, an embodiment of the present disclosure aims to provide a pile head analysis system, a pile head analysis method, and a storage medium in which a pile head analysis program is stored, which allow more efficient and consistently accurate analysis of a pile head.

In order to achieve the above object, the pile head analysis system, which is a system for analyzing a pile head of an driven pile, according to an embodiment of the present disclosure includes: an image acquiring unit that acquires a plurality of images of a target area including the pile imaged by a camera mounted on a movable body, a three-dimensional model generating unit that generates a three-dimensional model of the target area from the images acquired by the image acquiring unit, a pile head detecting unit that detects the pile head from the three-dimensional model generated by the three-dimensional model generating unit, and a consistency determination unit that determines consistency between the pile head detected by the pile head detecting unit and a pile head based on preliminarily acquired design information.

In order to achieve the above object, the pile head analysis method, which is a method for analyzing a pile head of a driven pile, according to an embodiment of the present disclosure includes: an image acquiring step of acquiring a plurality of images of a target area including the pile imaged by a camera mounted on a movable body, a three-dimensional model generating step of generating a three-dimensional model of the target area from the images acquired in the image acquiring step, a pile head detecting step of detecting the pile head from the three-dimensional model generated in the three-dimensional model generating step, and a consistency determining step of determining consistency between the pile head detected in the pile head detecting step and preliminarily acquired design information.

In order to achieve the above object, a storage medium in which a pile head analysis program according to an embodiment of the present disclosure is stored, the storage medium being a non-transient storage medium in which a pile head analysis program analyzing a pile head of a driven pile is stored, causes a computer to execute: an image acquiring step of acquiring a plurality of images of a target area including the pile imaged by a camera mounted on a movable body, a three-dimensional model generating step of generating a three-dimensional model of the target area from the images acquired in the image acquiring step, a pile head detecting step of detecting the pile head from the three-dimensional model generated in the three-dimensional model generating step, and a consistency determining step of determining consistency between the pile head detected in the pile head detecting step and preliminarily acquired design information.

According to an embodiment of the pile head analysis system according to the present disclosure using the above means, a pile head can be analyzed in a more efficient and consistently accurate manner.

DETAILED DESCRIPTION

An embodiment of the present disclosure will now be described with reference to the drawings.

Figure 1:
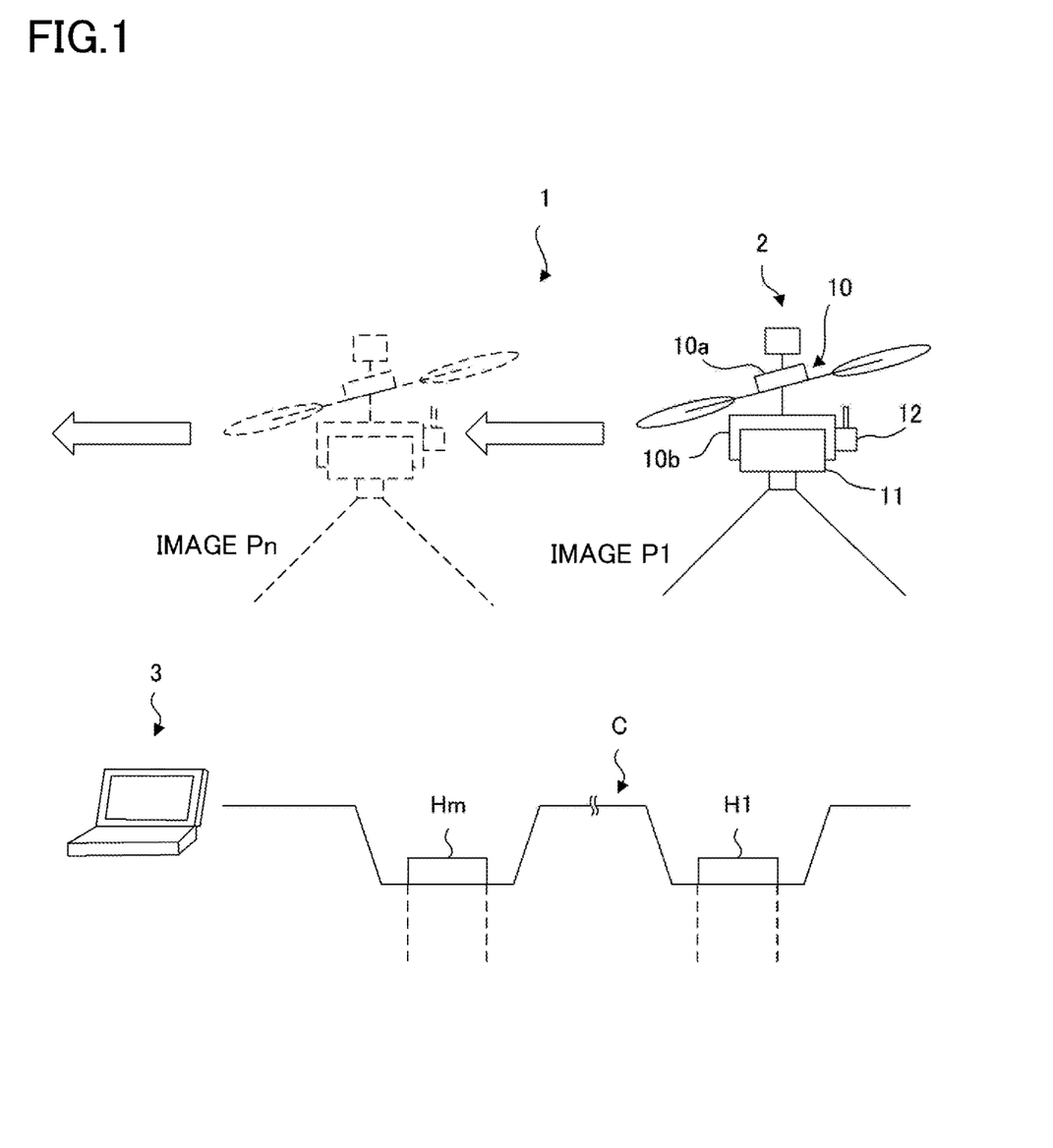
FIG. 1 is a drawing of an overall structure of a pile head analysis system according to an embodiment of the present disclosure.
Figure 2:
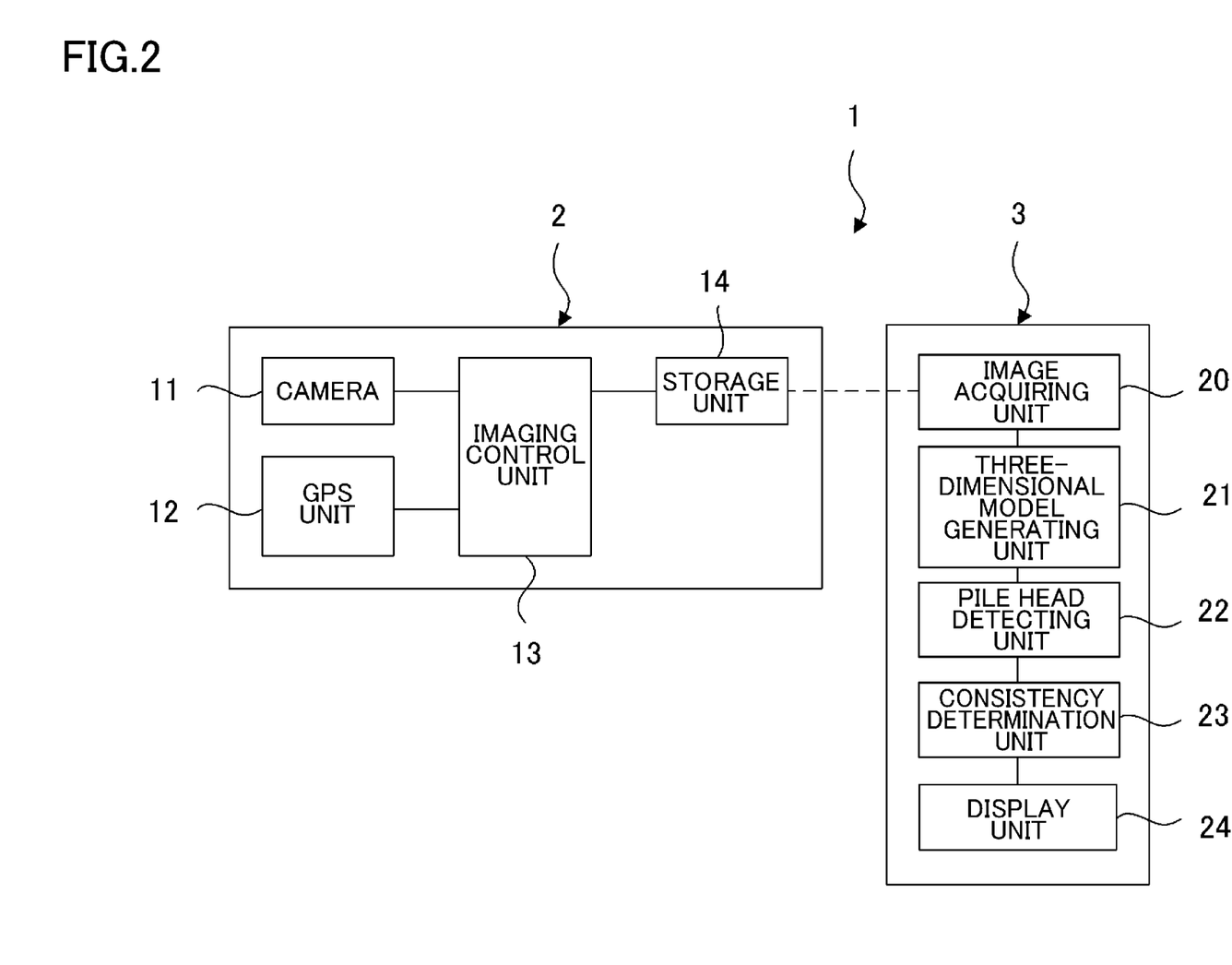
FIG. 2 is a control block diagram of the pile head analysis system.

FIG. 1 illustrates an overall structure of a pile head analysis system according to an embodiment of the present disclosure, and FIG. 2 is a control block diagram of the pile head analysis system. A configuration of the pile head analysis system will now be described based on these drawings.

A pile head analysis system 1 is an analysis system using photogrammetry and includes a movable imaging device 2 capturing a plurality of images for photogrammetry while moving in the sky above a construction site C and an analysis device 3 generating a three-dimensional model from the images captured by the movable imaging device 2 and analyzing a pile head.

In the construction site C of this embodiment, driven piles have respective pile heads H1, H2, . . . Hm, which have undergone pile head processing, exposed in an excavation pit. In this embodiment, a cylindrical steel pile is used as an example; however, any material and shape of the pile are applicable. Example of the pile may have corners with a rectangular section.

The movable imaging device 2 includes an unmanned aerial vehicle (UAV) 10 as a movable body and a camera 11 mounted on the UAV10 to capture an image for photogrammetry. The camera 11 may capture a still image and a moving image.

More specifically, the UAV10 is a flying movable body capable of flying on a predetermined flight path or freely flying via remote control, in the sky above the construction site C. The UAV10 includes a gimbal mechanism 10b under a flight mechanism 10a for flight.

The camera 11 is supported by the gimbal mechanism 10b of the UAV10 and is free to change directions of imaging using the gimbal mechanism 10b. In this embodiment, the gimbal mechanism 10b maintains the attitude in a manner constantly capturing images of the construction site C in the downward direction from above.

The camera 11 has a GPS unit 12 capable of receiving a GPS signal. The GPS unit 12 is capable of measuring the current position of the movable imaging device 2 based on a received GPS signal.

The analysis device 3 is an information processing terminal such as a personal computer (PC) capable of executing a program for photogrammetry and a program for pile analysis.

Configurations of control systems installed on the movable imaging device 2 and the analysis device 3 of the pile head analysis system 1 will now be described with reference to FIG. 2. A known technique may be applied to flight control for the UAV10 of the movable imaging device 2, and detailed description will therefore be omitted.

As illustrated in FIG. 2, the movable imaging device 2 includes an imaging control unit 13 and a storage unit 14 in addition to the above-described camera 11 and the GPS unit 12. The movable imaging device 2 further includes an operation unit, a display unit, and others, which are not illustrated.

The imaging control unit 13 is electrically connected with the camera 11 and the GPS unit 12. The imaging control unit 13 has a function of controlling the camera 11 to capture images at predetermined imaging intervals in a manner allowing adjacent images to partially overlap with each other and acquiring position information at the time of imaging from the GPS unit 12. The imaging control unit 13 stores an image captured by the camera 11 and position information acquired by the GPS unit 12 in the storage unit 14 in a manner associated with each other.

Examples of the storage unit 14 include a flash memory capable of storing various kinds of information. The storage unit 14 mainly stores an image including position information transmitted from the imaging control unit 13. The information stored in the storage unit 14 can be transmitted or copied to another storage medium or another device through wired or wireless communication.

The analysis device 3 mainly includes an image acquiring unit 20, a three-dimensional model generating unit 21, a pile head detecting unit 22, a consistency determination unit 23, and a display unit 24. The analysis device 3 stores design information including the coordinates of a point where a pile is driven in the construction site C and specifications such as the shape and the size of a pile, in a storage unit (not illustrated).

The image acquiring unit 20 acquires an image including position information stored in the above-described storage unit 14.

The three-dimensional model generating unit 21 generates a three-dimensional model based on a plurality of images acquired by the image acquiring unit 20 using a technique of photogrammetry. More specifically, the three-dimensional model generating unit 21 generates a three-dimensional model (a stereo model) by extracting feature points shared between the images partially overlapping with one another and composing an image in a manner spatially aligning the positional relation. For example, the shape and vertexes of an excavation pit in the construction site C may be used as feature points. In another manner, an aerial survey marker or the like is placed on each known point of the construction site C in advance. The marker is used as a ground control point for associating (associating relative coordinates with absolute coordinates) an image with a point on the ground and also used as a validation point for accuracy check. Furthermore, workability of three-dimensional measurement of a pile head position can be improved by, for example, attaching an aerial survey marker or any mark easily recognized in image processing to a pile head or using the shape of the pile itself.

The pile head detecting unit 22 detects a pile head from a three-dimensional model generated by the three-dimensional model generating unit 21. More specifically, a pile head may be automatically detected using an image recognition technique or manually detected by an operator visually finding a pile head from the three-dimensional model through the display unit 24. The pile head detecting unit 22 detects the position of a pile core, the height, and inclination of the detected pile head. The pile head detecting unit 22 detects XY coordinates (horizontal plane coordinates) of the center point of a cylindrical pile head as the position of a pile core, detects Z coordinates (vertical coordinates) from the ground surface to the top face of the pile as the height of a pile head, and detects an angular difference between a pile core axis and the Z axis (vertical axis) as inclination of the pile head.

The consistency determination unit 23 determines consistency between the pile head detected by the pile head detecting unit 22 and the specifications of a pile head indicated in design information preliminarily acquired from a storage unit. More specifically, the consistency determination unit 23 determines if each of the position of a pile core, the height of a pile head, and inclination of a pile head falls within a tolerance range for a value indicated in the design information.

The display unit 24 is, for example, a display of a PC and is capable of displaying information relating to consistency of a pile head determined by the consistency determination unit 23 on a three-dimensional model generated by the three-dimensional model generating unit 21.

As illustrated in FIG. 1, the pile head analysis system 1 configured as above has the movable imaging device 2 capture a plurality of images P1, P2, . . . , Pn for photogrammetry at certain imaging intervals while moving in the sky above the construction site C. The pile head analysis system 1 further has the analysis device 3 generate a three-dimensional model from the images P1, P2, . . . , Pn, detect a pile head, and determine consistency on the pile head.

Figure 3:
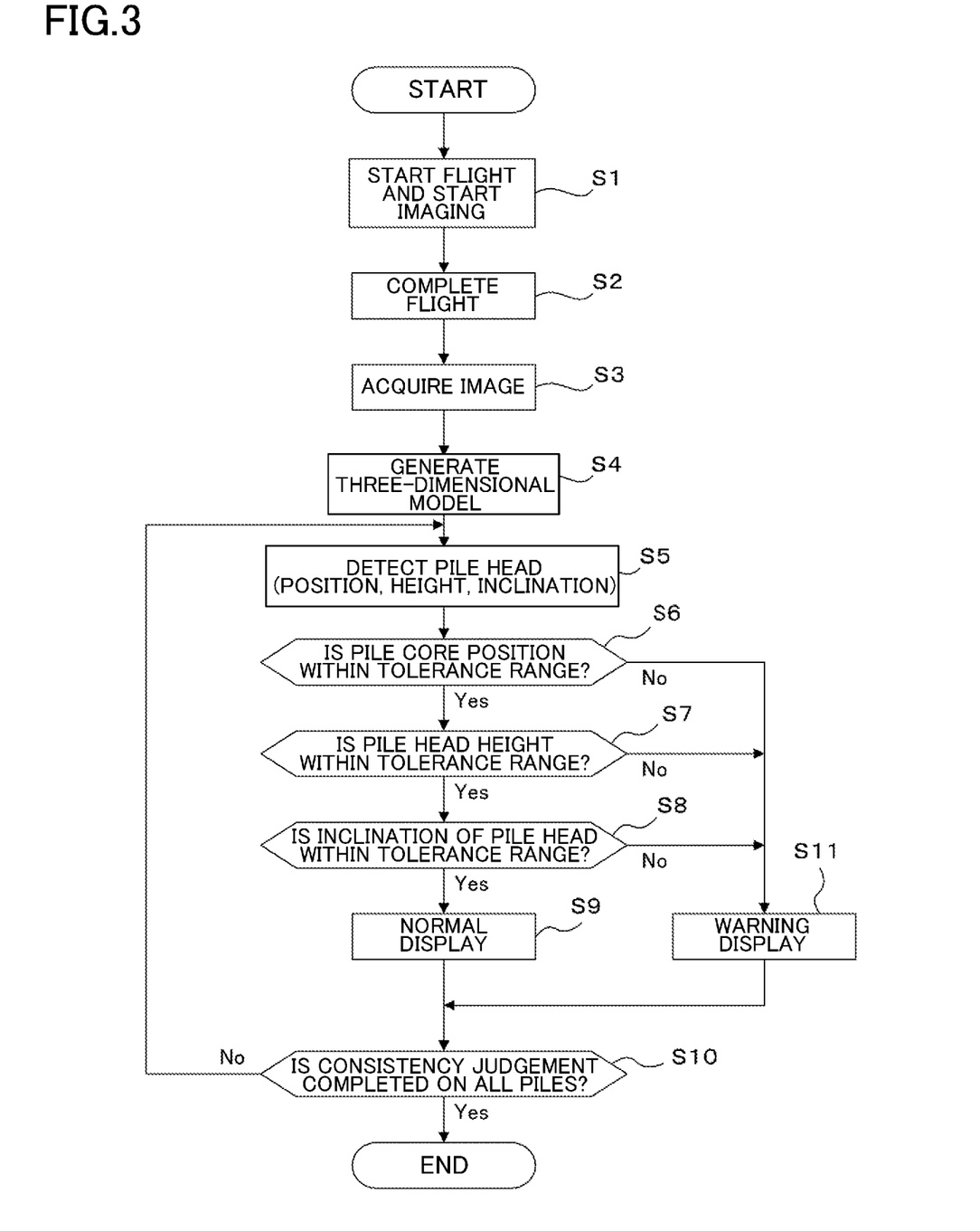
FIG. 3 is a flowchart illustrating a routine of the pile head analysis.
Figure 4:
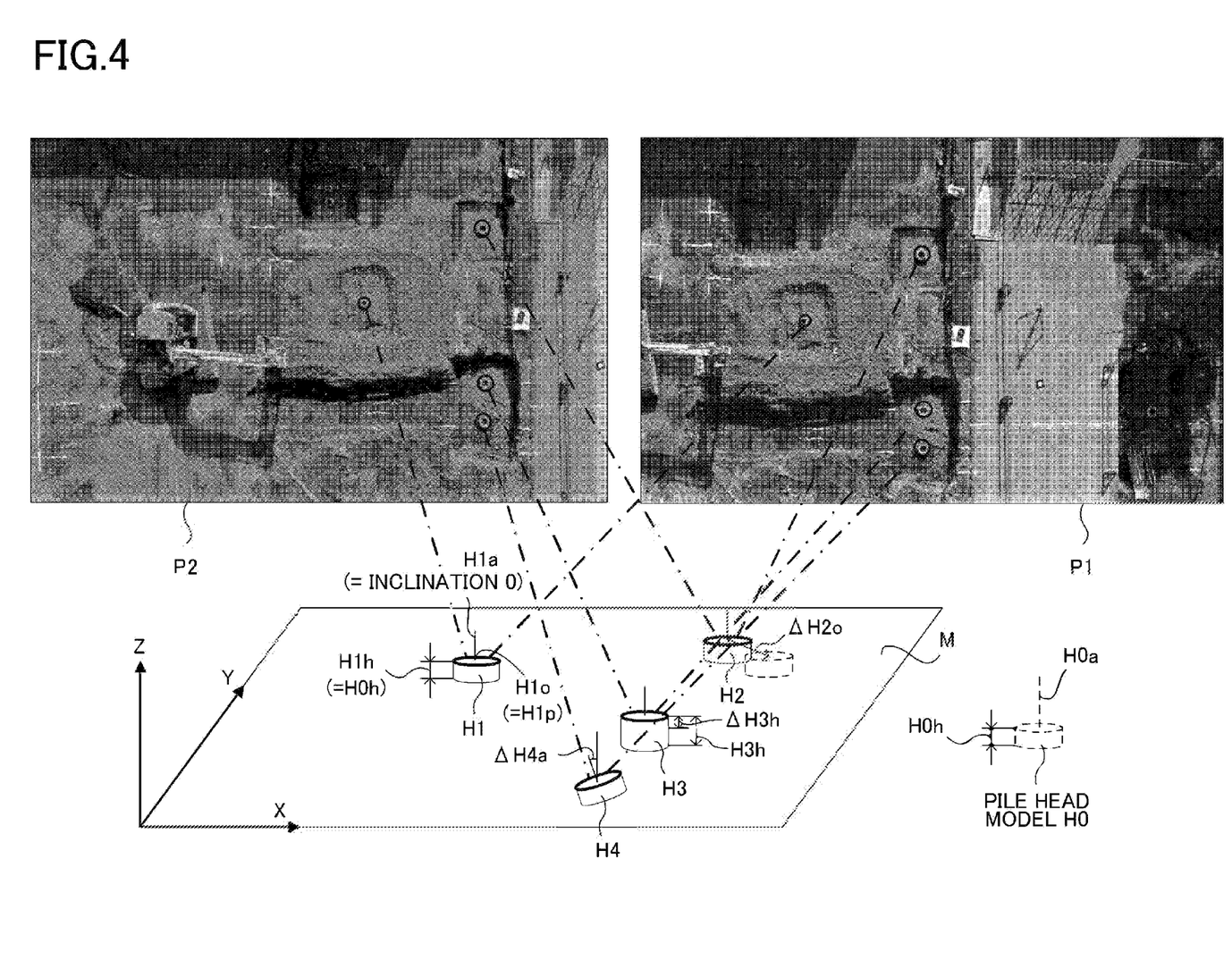
FIG. 4 is a conceptual diagram that illustrates a pile head portion extracted using photogrammetry.

FIG. 3 illustrates a pile head analysis routine of a pile head analysis system according to this embodiment, and FIG. 4 is an illustrative diagram for consistency determination of a pile head. A pile head analysis method executed by a pile head analysis program will now be described along the flowchart of FIG. 3 while referring to FIG. 4. In FIG. 4, a three-dimensional model M is planarly illustrated with only pile heads illustrated three-dimensionally for simplicity. In the drawing, the pile head is shown greater in, for example, size, height and inclination than an actual pile head.

As illustrated in FIG. 3, at Step S1 in the pile head analysis routine, the movable imaging device 2 flies in the sky above the construction site C and captures images of the construction site C at certain intervals with adjacent images partially overlapping with each other. At each time of imaging, the imaging control unit 13 acquires position information of the movable imaging device 2 at the time of imaging using the GPS unit 12 and stores an image including the position information in the storage unit 14.

At Step S2, the movable imaging device 2 completes imaging and finishes the flight.

At Step S3, the image acquiring unit 20 of the analysis device 3 acquires an image including position information from the storage unit 14 of the movable imaging device 2 (an image acquiring process).

At Step S4, the three-dimensional model generating unit 21 generates a three-dimensional model based on a plurality of acquired images using a technique of photogrammetry (a three-dimensional model generating process). Specifically, the three-dimensional model generating unit 21 estimates an attitude (an exterior orientation) in which each image has been taken and a calibration parameter (an inner orientation) of the camera. The three-dimensional model generating unit 21 further extracts feature points from each image, matches the feature points between images, and generates a stereo model. The three-dimensional model generating unit 21 designates a pixel of an imaged object (for example, a pile head) from a plurality of images and measures a three-dimensional position, which is called manual measurement. In another manner, three-dimensional point cloud data may be generated for an area overlapping between images by automating the manual measurement.

At Step S5, the pile head detecting unit 22 detects a pile head from the generated three-dimensional model (a pile head detecting process).

At Step S4 and Step S5, specifically, as illustrated in FIG. 4, the three-dimensional model generating unit 21 generates the three-dimensional model M from images P1 and P2 partially overlapping with each other and other images (not illustrated).

In FIG. 4, the three-dimensional model M includes a first pile head H1 to a fourth pile head H4, and the pile head detecting unit 22 automatically or manually detects these pile heads. The pile head detecting unit 22 further detects, on each pile, the position of a pile core (for example, H1$o$), the height of a pile head (for example, H1$h$), and a pile core axis (for example, H1$a$), and consistency is determined on the detected piles in subsequent steps S6 to S8 (a consistency determining process).

At Step S6, the consistency determination unit 23 determines if the position of a pile core is within a tolerance range. For example, the consistency determination unit 23 calculates a positional difference between coordinates of the position of a pile core of a pile head and coordinates of the position of a pile core indicated in design information and determines whether the positional difference is within a predetermined tolerance range. If the result of determination is true (Yes), in other words, as indicated by a first pile head H1 in FIG. 4, if the coordinates of the pile core position H1$o$ substantially match with a pile core position H1$p$ (a pile driven point) in the design information, the process proceeds to the next step S7.

At Step S7, the consistency determination unit 23 determines if the height of a pile head is within a tolerance range. For example, the consistency determination unit 23 calculates a difference between the height of a pile head and a pile head height H0$h$ of a pile head model H0 and determines if the difference in height is within a predetermined tolerance range. If the result of determination is true (Yes), in other words, as the first pile head H1 in FIG. 4 indicates, if the pile head height H1$h$ is substantially equal to a pile head height H0$h$ of the pile head model H0, the process proceeds to the next step S8.

At Step S8, the consistency determination unit 23 determines if inclination of a pile head is within a tolerance range. For example, the consistency determination unit 23 calculates a difference between inclination of a pile head and inclination (for example, vertical) of the pile head of the pile head model H0 and determines if the difference in inclination is within a predetermined tolerance range. If the result of determination is true (Yes), in other words, as the first pile head H1 in FIG. 4 indicates, if inclination of the pile head axis H1$a$ is substantially equal (inclination: zero) to inclination of a pile head axis H0$a$ of the pile head model H0, the process proceeds to the next step S9.

At Step S9, the display unit 24 determines a pile head in which results of determinations at Step S6 to Step S8 are all true (Yes) to be driven substantially in accordance with the design and displays the pile head on the display screen in a manner of normal display. The first pile head H1 in FIG. 4 is therefore displayed in normal display.

Ins the subsequent step S10, the consistency determination unit 23 determines whether consistency determination is completed on all the pile heads detected in the above Step S5. If the result of determination is true (Yes), the routine ends. If the result of determination is false (No), in other words, if consistency of any pile head remains undetermined, the process returns to Step S5, and the consistency determination is performed on the next pile head.

If any of determinations at Step S6 to Step S8 is determined to be false (No), in other words, if at least one of the position of a pile core, the height of a pile head, and inclination of a pile head is outside the tolerance range, the process proceeds to Step S11.

At Step S11, a warning is displayed on the display screen for a pile head that falls outside the tolerance range. This warning display may be changed depending on the type of element (the position of a pile core, the height of a pile head, and inclination of a pile head) that is outside the tolerance range or may be changed depending on the amount of difference.

In the example of FIG. 4, the second pile head H2 has a position difference ΔH2o that is outside the tolerance range, the third pile head H3 has a height difference ΔH3h outside the tolerance range, and the fourth pile head has an inclination difference ΔH4a outside the tolerance range.

As described above, the pile head analysis system 1 of this embodiment has the analysis device 3 acquire a plurality of images of the construction site C imaged by the camera 11 mounted on the UAV10. The analysis device 3 generates a three-dimensional model from the images, detects pile heads, and determines consistency on each pile head. In generating a three-dimensional model for photogrammetry, the group cloud data does not have to be acquired over the entire construction side as a laser scanner acquires. Instead, the group cloud data may be generated only for a necessary range including pile heads, which is sufficient for consistency of the determination. This manner allows a reduction in the amount of data and more efficient analysis of a pile head. In addition, this manner can achieve more consistent accuracy compared to measurement of pile heads by an operator.

Moreover, the state of a driven pile can be evaluated by detecting the position of a pile core of the pile head, the height of the pile head, and inclination of the pile head from a three-dimensional model generated based on photogrammetry and determining consistency on each of the elements.

Such a display as the three-dimensional model M in FIG. 4 makes information relating to consistency of a pile head more comprehensible to viewers, which allows early discovery of a defect in a driven pile head.

From the above-described viewpoints, the pile head analysis system, the pile head analysis method, and the pile head analysis program according to the embodiment allow a pile head to be analyzed in a more efficient and consistently accurate manner.

An embodiment of this disclosure has been described as above; however, aspects of the present disclosure are not limited to this embodiment.

In this embodiment, the pile head detecting unit 22 automatically or manually detects a pile head. Instead of this manner, a pile head may be colored at the construction site C before imaging by the movable imaging device 2. The color may be used as an element for detecting the pile head from a three-dimensional model. For example, respective different colors may be used for the types of pile. A color of an object cannot be recognized in point cloud data generated by a laser scanner; however, photogrammetry can use actual colors of the construction site C for modelization. This allows a pile head to be detected in a more smooth and accurate manner.

In the embodiment, the movable imaging device 2 uses the UAV10 as a movable body; however, the movable body is not limited to an UAV and, for example, may be a manned aircraft.

In the embodiment, the GPS unit 12 is used to measure the position of the movable imaging device 2; however, means of measuring the position of the movable imaging device 2 is not limited to a GPS. For example, an auto-tracking total station may be used to track the movable imaging device 2 and measure its position.

What is claimed is:

1. A pile head analysis system for analyzing a pile head position of a driven pile by a computer, the pile head analysis system comprising:
   a movable imaging device configured to acquire a plurality of images of a target area including the pile imaged by a camera mounted on the movable imaging device;
   a three-dimensional model generating unit configured to generate a three-dimensional model of the target area using photogrammetry from the images acquired by the movable imaging device;
   a pile head detecting unit configured to detect the pile head using an image recognition from the three-dimensional model generated by the three-dimensional model generating unit; and
   a consistency determination unit configured to determine consistency between a position of the pile head detected by the pile head detecting unit and a position of a pile head based on preliminarily acquired design information;
   wherein the pile head detecting unit is configured to detect a position of a pile core of the pile head, a pile head height that is a height of the pile head from a ground surface to a top face of the pile, and an inclination of the pile head; and
   wherein the consistency determination unit is configured to:
     determine whether a positional difference between coordinates of the position of the pile core and coordinates of the position of a pile core indicated in the design information is within a predetermined tolerance range;
     determine whether a difference in height between the pile head height and a pile head height based on the design information is within a predetermined tolerance range; and
     determine whether a difference in inclination between the inclination of the pile head and an inclination of the pile head based on the design information is within a predetermined tolerance range.

2. The pile head analysis system of claim 1, wherein the three-dimensional model generating unit is configured to generate a group cloud data only for a necessary range including pile heads.

3. The pile head analysis system of claim 1, further comprising:
   a display unit configured to display information relating to consistency of a pile head determined by the consistency determination unit on a three-dimensional model generated by the three-dimensional model generating unit;
   wherein if the positional difference, the difference in height, and the difference in inclination are determined to be in the predetermined tolerance range, the display unit displays the pile head on the display unit in a manner of normal display; and
   wherein if at least one of the positional difference, the difference in height and the difference in inclination are determined to be outside the predetermined tolerance ranges, a warning is displayed on the display unit for the pile head that falls outside the tolerance range.

4. The pile head analysis system of claim 1, wherein
the pile head is colored, and
the pile head detecting unit includes the color as an element for detecting a pile head from the three-dimensional model.

5. A pile head analysis method for analyzing a pile head position of a driven pile by a computer, the pile head analysis method comprising:
acquiring a plurality of images of a target area including the pile imaged by a camera mounted on a movable imaging device;
generating a three-dimensional model of the target area from the acquired images;
detecting the pile head from the generated three-dimensional model;
detecting a position of a pile core of the pile head, a pile head height that is a height of the pile head from a ground surface to a top face of the pile, and an inclination of the pile head;
determining whether a positional difference between coordinates of the position of the pile core and coordinates of the position of a pile core indicated in design information is within a predetermined tolerance range;
determining whether a difference in height between the pile head height and a pile head height based on the design information is within a predetermined tolerance range;
determining whether a difference in inclination between the inclination of the pile head and an inclination of the pile head based on the design information is within a predetermined tolerance range; and
determining consistency between the detected pile head and preliminarily acquired design information.

6. A non-transient storage medium in which a pile head analysis program analyzing a pile head position of a driven pile is stored, the pile head analysis program causing a computer to execute:
acquiring a plurality of images of a target area including the pile imaged by a camera mounted on a movable imaging device;
generating a three-dimensional model of the target area from the acquired images;
detecting the pile head from the generated three-dimensional model;
detecting a position of a pile core of the pile head, a pile head height that is a height of the pile head from a ground surface to a top face of the pile, and an inclination of the pile head;
determining whether a positional difference between coordinates of the position of the pile core and coordinates of the position of a pile core indicated in design information is within a predetermined tolerance range;
determining whether a difference in height between the pile head height and a pile head height based on the design information is within a predetermined tolerance range; and
determining whether a difference in inclination between the inclination of the pile head and an inclination of the pile head based on the design information is within a predetermined tolerance range; and
determining consistency between the detected pile head and preliminarily acquired design information.

* * * * *